Patented Jan. 11, 1944

2,339,012

UNITED STATES PATENT OFFICE 2,339,012

CELLULOSE SOLUTION AND A PROCESS OF PREPARING SUCH SOLUTION

Otto Hecht, Ludwigshafen-on-the-Rhine, and Ernst Gassenmeier, Mannheim, Germany; vested in the Alien Property Custodian No Drawing. Application August 20, 1940, Serial No. 353,386. In Germany August 17, 1939

15 Claims. (Cl. 106—203)

The present invention relates to cellulose solutions and a process of preparing such solutions.

It has been known that cellulose may be dissolved in aqueous solutions of quaternary ammonium hydroxides, for example in aqueous solutions of quaternary benzylammonium-hydroxides.

We have now found that solutions of quaternary pyrrolidinium hydroxides are especially suitable for dissolving cellulose. The solutions obtained are clear and filtrable and may be stored for a long period of time.

Quaternary pyrrolidinium hydroxides are easily obtained by treating N-substituted pyrrolidines with mineral acid esters of aliphatic, cycloaliphatic or araliphatic alcohols, e. g. alkyl or aralkyl halides, dialkyl sulfates or para-toluene sulfonic acid alkyl esters, and saponifying the quaternary salts obtained with water in the presence of metal oxides or hydroxides, such as barium hydroxide or silver oxide.

Generally speaking, the range of concentration within which the pyrrolidinium hydroxides are effective solvents for cellulose is from about normal to 4 normal. The pyrrolidinium hydroxide may be dissolved in water or in liquid alcohols or in mixtures of water with alcohols. These solutions are capable of dissolving cellulose at normal temperature or at lower temperatures, such as from $-10$ to $10°$ C. Higher temperatures may also be used. In order to increase the solubility of cellulose in these solutions, superatmospheric pressure may be employed, for example by applying an inert gas, such as nitrogen under high pressure. Dissolution may also be facilitated by using mechanical means, such as shaking or stirring devices.

The cellulose to be dissolved may be of natural origin or regenerated. There may be used cotton linters, bleached sulfite or sulfate cellulose, mechanical wood pulp, regenerated cellulose such as viscose or cuprammonium artificial fibres or other hydrated cellulose.

The cellulose solutions prepared may be used for the manufacture of fibres or foils by passing the solutions through suitable orifices into acid solutions. Cellulose sheets may also be prepared from such solutions by flowing them in a uniform layer on a plate and allowing the solvent to evaporate.

The following examples will further serve to illustrate the practice of our invention. The invention, however, is not restricted to these examples. The parts are by weight.

Example 1

5 parts of cotton linters are added to 100 parts of a 3 normal aqueous solution of N.N-diethylpyrrolidinium hydroxide. The mixture is allowed to stand at $0°$ C., while shaking it from time to time, until there is obtained a clear, pale yellow solution. Further 1.5 parts of cotton linters may be dissolved when applying the solution to linters under a nitrogen pressure of 100 atmospheres.

Instead of N.N-diethylpyrrolidinium hydroxide there may be used analogous compounds wherein one or two ethyl groups are replaced by other alkyl groups such as methyl, amyl, hexyl, etc. or by the benzyl group.

Example 2

6 parts of cotton linters are treated in the manner described with 100 parts of a 3 normal solution of N-propyl-N-ethylpyrrolidinium hydroxide. A clear solution is thus obtained. When working under a pressure of 100 atmospheres, 7 parts of linters may be dissolved.

Under otherwise identical conditions 8 parts of cotton linters may be dissolved in 100 parts of a 3 normal aqueous solution of N-butyl-N-ethylpyrrolidinium hydroxide under normal pressure, whereas 10 parts of linters are dissolved under 100 atmospheres pressure.

What we claim is:

1. The process of preparing cellulose solutions which consists in treating cellulose with a solution of a quaternary pyrrolidinium hydroxide in a solvent selected from the group consisting of water, liquid alcohols and mixtures thereof, the range of concentration of said pyrrolidinium hydroxide being from about normal to 4-normal.

2. The process of preparing cellulose solutions which consists in treating cellulose with an aqueous solution of a quaternary pyrrolidinium hydroxide, the range of concentration of said pyrrolidinium hydroxide being from about normal to 4-normal.

3. The process of preparing cellulose solutions which consists in treating cellulose with an aqueous solution of N.N-dialkyl pyrrolidinium hydroxide, the range of concentration of said pyrrolidinium hydroxide being from about normal to 4-normal.

4. The process of preparing cellulose solutions which consists in treating cellulose with an aqueous solution of N-alkyl-N-ethyl pyrrolidinium hydroxide, the range of concentration of said pyrrolidinium hydroxide being from about normal to 4-normal.

5. The process of preparing cellulose solutions which consists in treating cellulose with an aqueous solution of N.N-diethyl pyrrolidinium hydroxide, the range of concentration of said pyrrolidinium hydroxide being from about normal to 4-normal.

6. The process of preparing cellulose solutions which consists in treating cellulose with an aqueous solution of N-ethyl-N-propyl pyrrolidinium hydroxide, the range of concentration of said pyrrolidinium hydroxide being from about normal to 4-normal.

7. The process of preparing cellulose solutions which consists in treating cellulose with an aqueous solution of N-ethyl-N-butyl pyrrolidinium hydroxide, the range of concentration of said pyrrolidinium hydroxide being from about normal to 4-normal.

8. A solution containing cellulose and a quaternary pyrrolidinium hydroxide dissolved in a solvent selected from the group consisting of water, liquid alcohols and mixtures thereof, the range of concentration of said pyrrolidinium hydroxide being from about normal to 4-normal.

9. An aqueous solution containing cellulose and a quaternary pyrrolidinium hydroxide, the range of concentration of said pyrrolidinium hydroxide being from about normal to 4-normal.

10. An aqueous solution containing cellulose and N.N-dialkyl pyrrolidinium hydroxide, the range of concentration of said pyrrolidinium hydroxide being from about normal to 4-normal.

11. An aqueous solution containing cellulose and N-alkyl-N-ethyl pyrrolidinium hydroxide, the range of concentration of said pyrrolidinium hydroxide being from about normal to 4-normal.

12. An aqueous solution containing cellulose and N.N-diethyl pyrrolidinium hydroxide, the range of concentration of said pyrrolidinium hydroxide being from about normal to 4-normal.

13. An aqueous solution containing cellulose and N-ethyl-N-propyl pyrrolidinium hydroxide, the range of concentration of said pyrrolidinium hydroxide being from about normal to 4-normal.

14. An aqueous solution containing cellulose and N-ethyl-N-butyl pyrrolidinium hydroxide, the range of concentration of said pyrrolidnium hydroxide being from about normal to 4-normal.

15. A process as in claim 1 in which the treatment is carried out under superatmospheric pressure by applying an inert gas under pressure.

OTTO HECHT.
ERNST GASSENMEIER.